United States Patent
Voss

[11] Patent Number: 5,954,316
[45] Date of Patent: Sep. 21, 1999

[54] ROLLING-LOBE AIR SPRING

[75] Inventor: Hartwig Voss, Hannover, Germany

[73] Assignee: Contitech Luftfedersysteme GmbH, Hannover, Germany

[21] Appl. No.: 08/963,612

[22] Filed: Nov. 4, 1997

[30] Foreign Application Priority Data

Nov. 4, 1996 [DE] Germany .......................... 296 19 081

[51] Int. Cl.[6] ...................................................... F16F 9/04
[52] U.S. Cl. ................................... 267/64.27; 267/64.24; 267/64.21
[58] Field of Search ............................. 267/64.19, 64.21, 267/64.23, 64.27, 64.25, 64.24

[56] References Cited

U.S. PATENT DOCUMENTS

| 4,506,910 | 3/1985 | Bierens | 267/64.21 |
| 4,564,177 | 1/1986 | Leonard | 267/64.24 |
| 5,382,006 | 1/1995 | Arnold | 267/64.27 |

FOREIGN PATENT DOCUMENTS

| 1048165 | 12/1958 | Germany . | |
| 3147231 | 3/1983 | Germany . | |
| 6032278 | 1/1962 | Italy | 267/64.27 |
| 964138 | 7/1964 | United Kingdom . | |

Primary Examiner—Robert J. Oberleitner
Assistant Examiner—Hargobind S. Sawhney
Attorney, Agent, or Firm—Walter Ottesen

[57] ABSTRACT

The invention is directed to an air spring (2) having a flexible member wherein a roll-off piston (8) is connected to a flexible member (6) of the air spring (2) via a threaded fastener assembly. The piston volume (8a) is used to provide a softer spring constant in that the piston volume (8a) and the volume (6a) of the flexible member (6) communicate with each other. The sealing ring configured at the lower edge (6c) of the flexible member (6) is clamped tightly between a clamping plate (12) and the sealing surface (8c) of the piston by utilizing a threaded spindle (10) which is sufficiently long. The clamping plate (12) is provided with holes (14). The clamping plate (12) can be configured as a deep-drawn pot provided with several bores (14).

6 Claims, 7 Drawing Sheets

ROLLING-LOBE AIR SPRING

BACKGROUND OF THE INVENTION

Air springs are developed in correspondence to the particular characteristics required such as supporting force, spring characteristic and spring path. Basically, there are two types of air springs, namely, rolling-lobe air springs and bellows air springs.

The rolling-lobe air springs described below essentially include a flexible member to accommodate the spring movement and a roll-off piston. The flexible member is made of elastic material. The open ends of the flexible member are sealed off by attachment parts. During spring action, a rolling lobe of the flexible member forms and rolls on the roll-off piston.

Air springs having a flexible member defining a rolling lobe are of at least two types: the first type has a clampable sealing bead formed at the end of the rolling lobe. The second type has a conical sealing surface at the end of the rolling lobe. These types differ by the way in which they are clamped. The air spring of the invention includes a sealing bead which can be clamped.

The spring characteristic is essentially dependent upon whether or not the particular volume of the roll-off piston is to be included with the volume of the flexible member as a spring variable.

U.S. Pat. No. 4,506,910 discloses an air spring having a flexible member defining a rolling lobe.

The spring element should be configured to be especially soft when the air spring is subjected to an increase of the spring path because of a lever arm. This, however, is not the case in the above-mentioned air spring. The suspension is hard because the resilience of the spring is provided exclusively by the volume of the flexible member and not also additionally by the volume of the piston as is the case, for example, in the air spring shown in German Patent 3,147,231.

In the last-mentioned air spring, the formed sheet metal part which delimits the flexible member with respect to the plunge piston, has openings through which the volume of the flexible member and the volume of the plunge piston are connected to each other. In this way, a greater overall volume is obtained which provides a softer spring action. The flexible member described in German Patent 3,147,231 includes sealing beads at its upper and lower ends. The sealing beads are connected to the rigid parts of the air spring by means of a snap ring or by means of a formed sheet metal part.

U.S. Pat. No. 4,506,919 discloses an air spring wherein the flexible member is connected to the piston utilizing threaded fasteners. In air springs of this kind, it was not possible to connect the piston volume because the tightness between the flexible member and the volume of the piston could not be ensured.

SUMMARY OF THE INVENTION

It is an object of the invention to utilize the piston volume of an air spring to provide a soft spring characteristic with the roll-off piston being securely connected to the flexible member of the air spring utilizing threaded fastener means.

The air spring of the invention includes: a cover plate; a roll-off piston defining a first volume therein; an air spring flexible member defining a second volume within the flexible member and having a first end connected to the cover plate and the air spring flexible member having a second end defining a sealing bead; a clamping plate assembly for clamping the sealing bead to the roll-off piston; and, means for connecting the first and second volumes to each other.

The piston volume is coupled to the volume of the flexible member in the configuration provided by the air spring according to the invention. A flatter spring characteristic is obtained by adding the piston volume to the volume of the flexible member; that is, the air spring becomes softer and the fundamental frequency of the spring mass system is reduced.

On the one hand, the bead of the flexible member is tightly clamped to the piston while, on the other hand, the piston can be disassembled, for example, for replacing parts. With the aid of the threaded spindle, clamping of the flexible member to the piston takes place to a certain extent externally whereby the assembly or disassembly is simplified to a considerable extent.

If the lower bead of the flexible member is vulcanized to the clamping plate, then an especially reliable sealing tightness between the flexible member and the piston is achieved. However, this becomes superfluous when connecting the piston volume to the volume of the flexible member. The tightness region is shifted to the external edge of the bead.

One or several peripherally extending sealing lips can be provided at this location of the bead of the flexible member. With these sealing lips, a seal tightness is reliably achieved between the sealing surface of the piston and the flexible member, which is clamped with the clamping plate.

BRIEF DESCRIPTION OF THE DRAWINGS

The invention will now be described with reference to the drawings wherein.

DESCRIPTION OF THE PREFERRED EMBODIMENTS OF THE INVENTION

Figure 2:
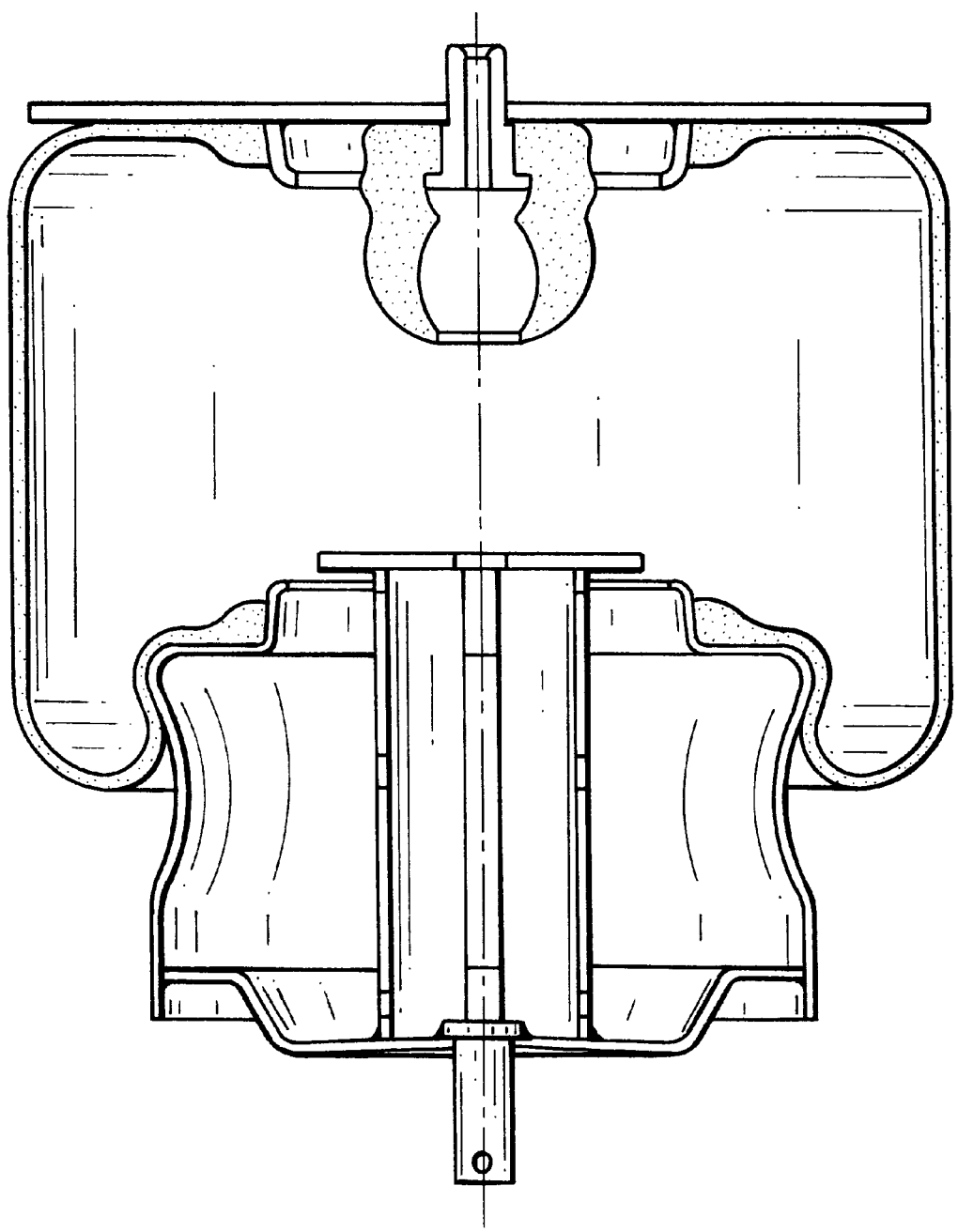
FIG. 2 is a conventional air spring having a conical seal.

It is easy to connect the piston volume to the volume of the flexible member in air springs having a conical sealing configuration at the piston as shown in FIG. 2.

Figure 3:
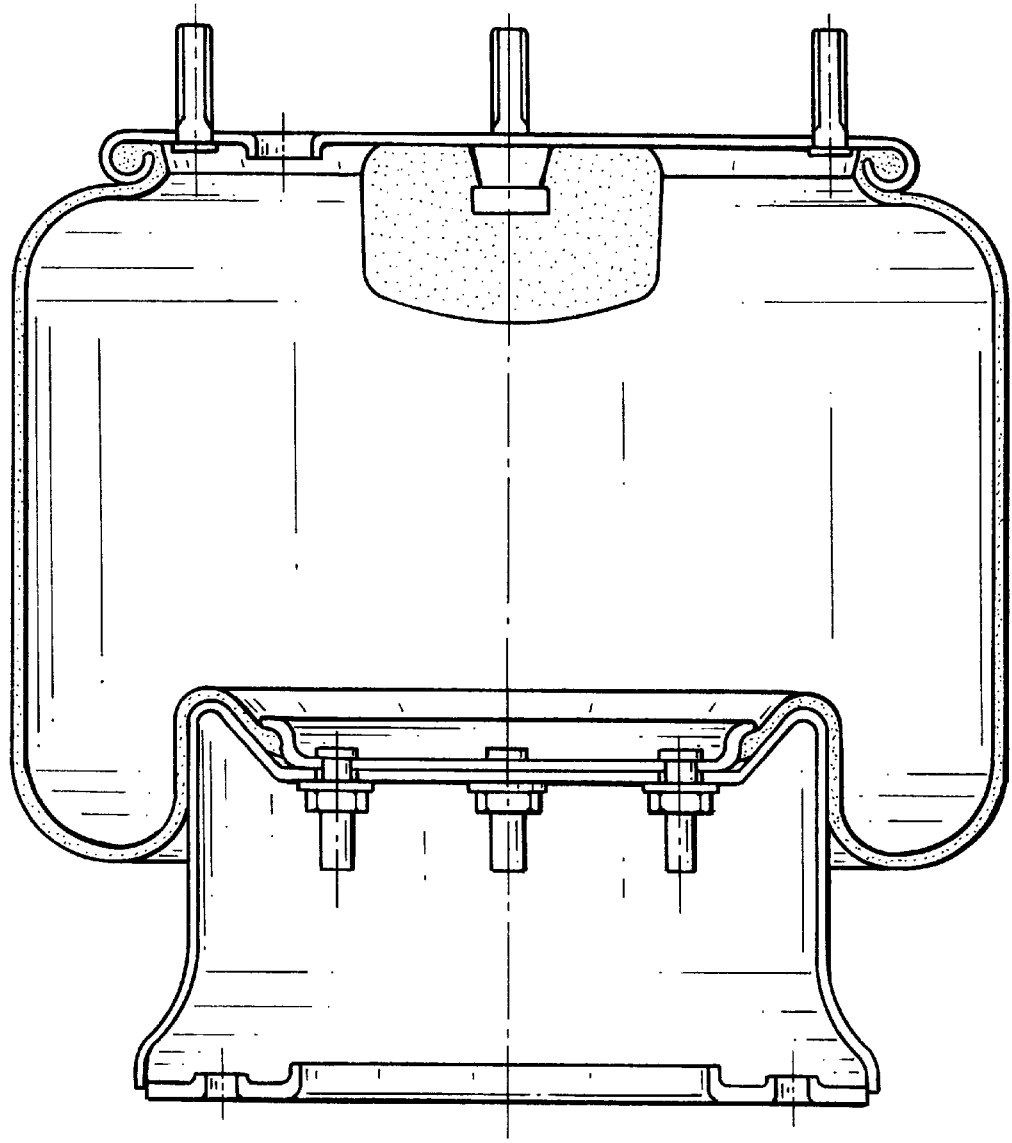
FIG. 3 is a conventional air spring without a connection to the piston volume as known from the state of the art.

In air springs, wherein the roll-off piston is fixedly connected to the clamping plate using threaded fasteners, the piston volume has, up to now, not or only partially been utilized. A conventional configuration of this kind is shown in FIG. 3. The assembly with threaded fasteners does not permit using fully the piston volume as part of the spring volume. However, fixedly connecting the bead to the piston utilizing threaded fasteners is necessary for specific axle configurations (for example, longitudinal lever and parabola lever) in the area of trucks and trailers with a large spring movement in order to prevent pulling the bead from the piston.

Figure 4:
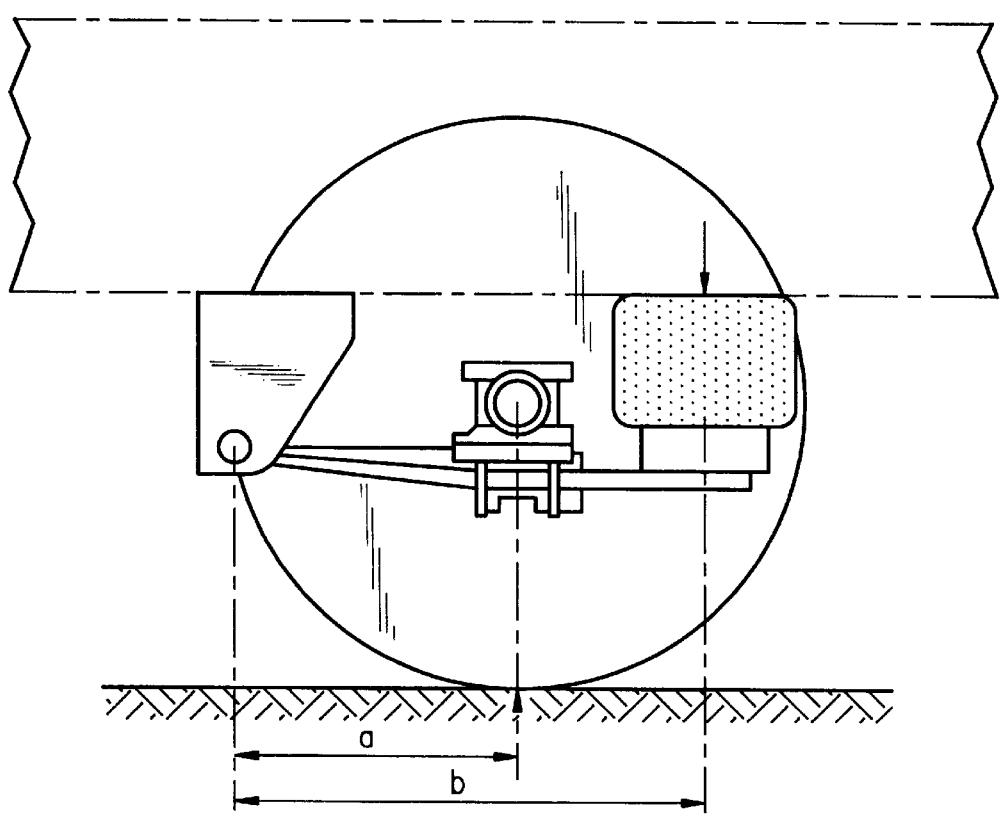
FIG. 4 is a preferred arrangement of air springs as utilized in trailers or truck rear axles.

In many cases, the air spring is seated behind the axle on a lever arm displaced from the fulcrum as shown in FIG. 4. A soft air spring is therefore necessary to obtain good spring comfort for axles of this kind.

Figure 1:
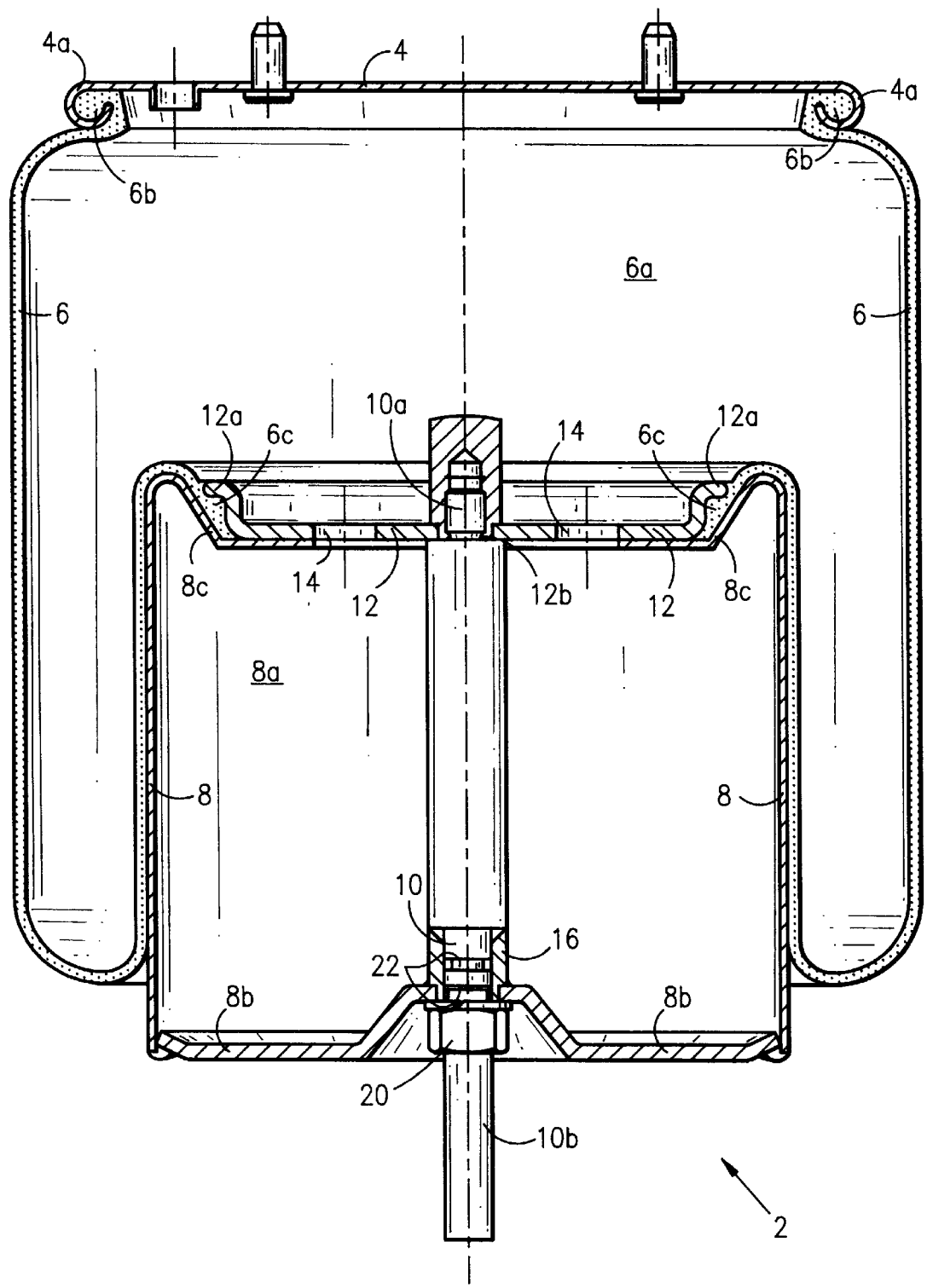
FIG. 1 is a section view of an embodiment of the air spring of the invention.

An embodiment of the air spring 2 of the invention is shown in FIG. 1. This configuration is based on the requirement to improve upon an air spring so that the piston volume 8a and the volume 6a of the flexible member are connected to each other.

The air spring 2 shown in FIG. 1 essentially comprises a cover plate 4, a flexible member 6 and a roll-off piston 8. The cover plate 4 is fastened to the vehicle frame or vehicle chassis and the roll-off piston is attached to the axle end or to the wheel end.

The upper edge 6b of the flexible member 6 is connected in a manner known per se to the external edge 4a of the cover plate 4.

The roll-off piston 8 is configured so as to have a pot-like shape and the base 8b thereof is closed. The upper end 8c of the piston 8 defines a concentric planar or conical sealing surface. The lower end of the flexible member 6 is provided with a sealing bead 6c and is in tight contact engagement with the sealing surface of the piston 8.

With the aid of an adequately long threaded spindle or rod 10, the bead, which is provided at the lower edge 6c of the flexible member 6, is tightly clamped between a perforated clamping plate 12 and the sealing surface 8c of the piston 8. The threaded rod 10 passes through a sleeve 16 mounted air tight at the base 8b of the piston 8. At its upper end 10a, the threaded rod 10 is threadably engaged with a thread 12b located at the center of the clamping plate 12; whereas, at its lower end 10b, the threaded rod 10 is provided with a nut 20.

By tightening the nut 20, the clamping plate 12 is drawn tight and the sealing lips of the bead 6c are pressed.

The edge 12a of the clamping plate 12 can be connected as a separate piece or by vulcanization to the lower edge 6c of the flexible member 6.

The clamping plate 12 is not configured so as to be closed in the conventional manner; instead, the clamping plate 12 has one, two or several holes 14 whereby the volume 8a of the piston and the volume 6a of the flexible member are connected to each other.

Conventional clamping plates are attached at the upper end face of the piston. In contrast, the clamping plate 12 in the air spring of the invention is attached to the base 8b of the piston. Here, at the piston base 8b, the threaded rod 10 is sealed with respect to the piston volume 8a utilizing O-rings 22.

The sealing of the bead 6c of the flexible member of the air spring to the sealing surface 8c (located at the upper end of the piston 8) likewise differs from the conventional seal. The conventional closed seal is shown in FIG. 7a wherein a sealing zone 24 is provided between the side of the bead and the edge of the clamping plate.

Figure 7A:
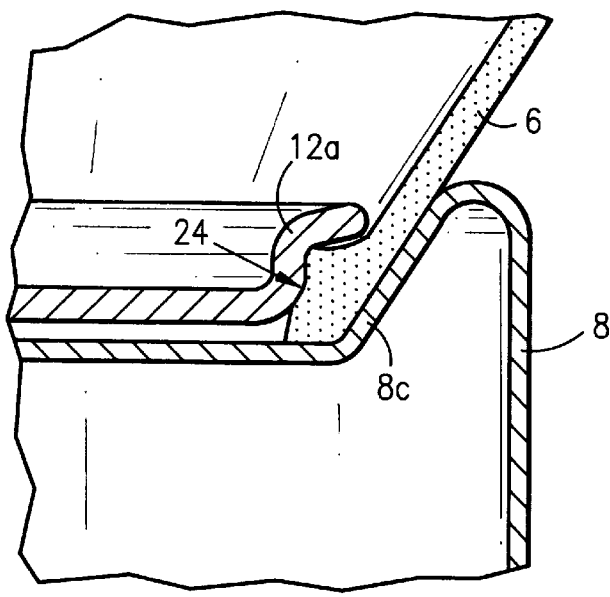
FIG. 7a shows a conventional sealing zone between the flexible member and the piston; and, FIG. 7b is a detail view showing a sealing zone between the flexible member and the piston according to another feature of the invention.
Figure 7B:
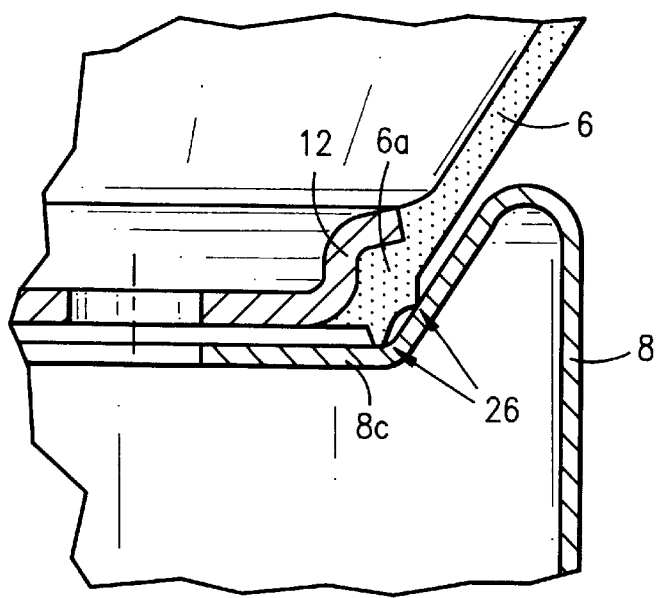

In contrast to the configuration shown in FIG. 7a, a sealing zone 26 is provided in the air spring of the invention between the outer side of the seal and the surface of the piston as shown in FIG. 7b. Also, the clamping plate 12 of the invention has bores (holes 14). In this way, a structural connection of the volume 6a of the flexible member to the piston volume 8a is provided.

Figure 5:
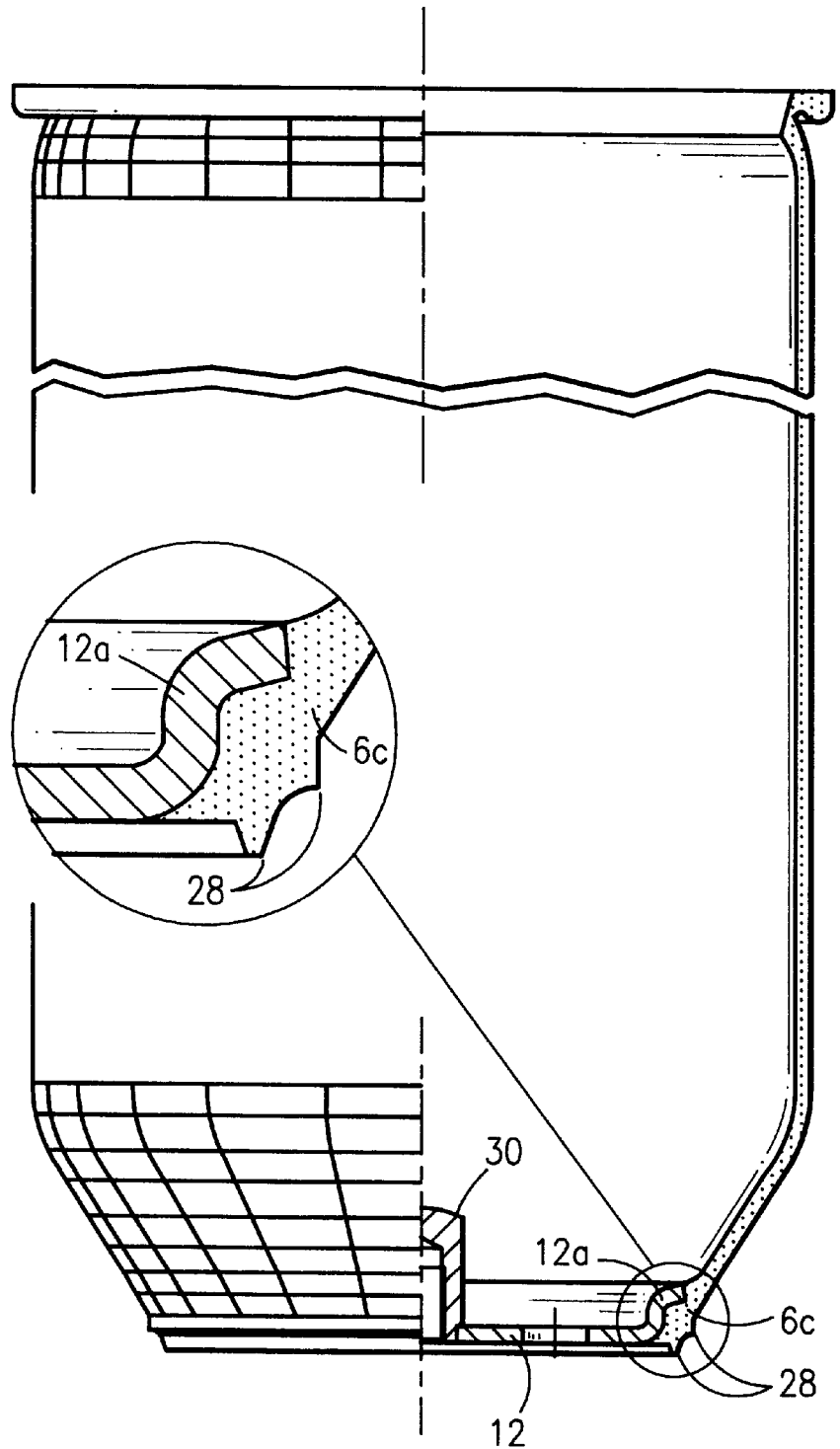
FIG. 5 is a schematic of another embodiment of the air spring of the invention.

In a preferred embodiment of the invention, the edge 12a of the clamping plate 12 is vulcanized in. In this embodiment, the bead 6c of the flexible member is provided at the piston end with one or more peripherally extending sealing ribs 28 as shown in FIG. 5 to provide improved sealing at the outer contour.

A rubber bumper 30 is preferably mounted at the upper end 10a of the threaded spindle 10 which projects above the clamping plate 12. In the embodiment shown in FIG. 1, the upper end 10a of the spindle 10 serves as a metal stop.

Figure 6:
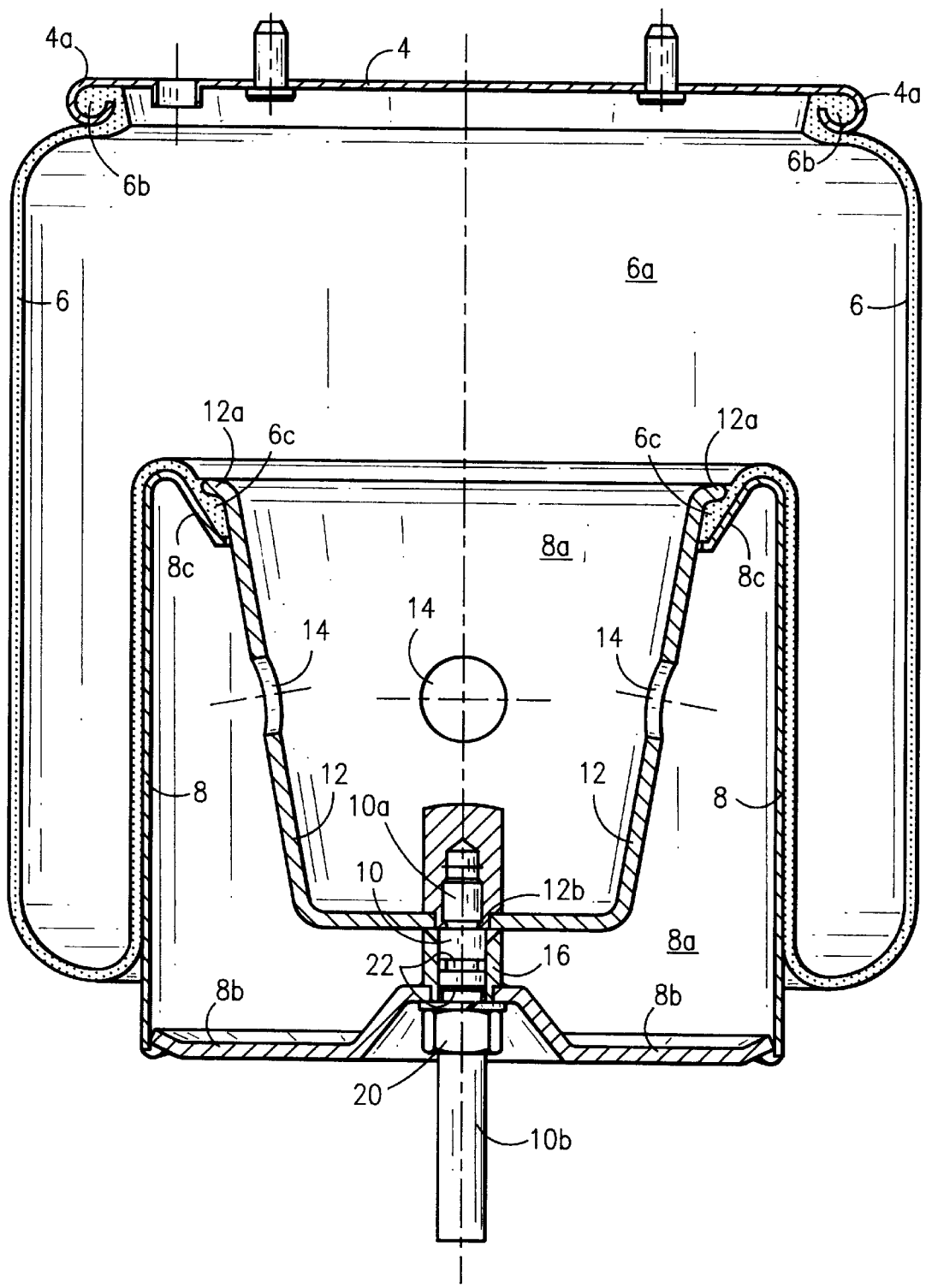
FIG. 6 is still another embodiment of the air spring of the invention wherein the clamping plate is configured as a deep-drawn pot.

The clamping plate 12 can be configured as a deep-drawn formed pot having one or more bores 14 for utilizing the volume 8a of the piston. This embodiment is shown in FIG. 6 and a correspondingly shorter threaded spindle 10 can be utilized.

It is understood that the foregoing description is that of the preferred embodiments of the invention and that various changes and modifications may be made thereto without departing from the spirit and scope of the invention as defined in the appended claims.

What is claimed is:

1. An air spring comprising:

a cover plate;

a roll-off piston defining a first volume therein;

an air spring flexible member defining a second volume within said flexible member and having a first end connected to said cover plate and said air spring flexible member having a second end defining a sealing bead;

a clamping plate assembly for clamping said sealing bead to said roll-off piston;

means for connecting said first and second volumes to each other;

said roll-off piston having an upper end defining a sealing surface and a lower end defining a base wall;

said clamping plate being interposed between said first and second volumes and said connecting means including at least one through hole formed in said clamping plate for interconnecting said first and second volumes to each other;

said sealing bead of said flexible member being disposed between said clamping plate and said sealing surface;

said clamping assembly including a threaded rod for applying a clamping force to said clamping plate to tightly clamp said sealing bead between said clamping plate and said sealing surface;

said threaded rod being connected to said base wall;

said clamping assembly further including at least one O-ring seal for sealing said threaded rod with respect to said base wall; and, said sealing bead having an external surface configured as a sealing zone between said flexible member and said sealing surface of said roll-off piston.

2. The air spring of claim 1, said clamping plate having a peripheral edge region in contact engagement with said sealing bead.

3. The air spring of claim 1, said clamping plate having a peripheral edge region vulcanized to said sealing bead.

4. The air spring of claim 1, said sealing bead having a plurality of peripherally extending sealing lips formed thereon.

5. The air spring of claim 1, said threaded rod having an upper end above said clamping plate and projecting into said first volume; said air spring further comprising a rubber bumper mounted on said upper end of said threaded rod.

6. The air spring of claim 1, said clamping plate being a deep-drawn pot-like structure and said connecting means being a plurality of through bores formed in said clamping plate.

\* \* \* \* \*